Nov. 18, 1924.  1,515,617

C. D. REYNOLDS ET AL

TOOL JOINT

Filed Sept. 29, 1922

INVENTORS
Charles B. Reynolds
Clarence D. Reynolds
by Hazard & Miller
ATT'YS.

Patented Nov. 18, 1924.

1,515,617

UNITED STATES PATENT OFFICE.

CLARENCE D. REYNOLDS AND CHARLES B. REYNOLDS, OF WHITTIER, CALIFORNIA.

TOOL JOINT.

Application filed September 29, 1922. Serial No. 591,297.

*To all whom it may concern:*

Be it known that we, CLARENCE D. REYNOLDS and CHARLES B. REYNOLDS, citizens of the United States, residing at Whittier, in the county of Los Angeles and State of California, have invented new and useful Improvements in Tool Joints, of which the following is a specification.

This invention relates to joints for strings of pipe sections, and more particularly to joints for deep well drilling pipes. It is an object of the present invention to provide an extremely simple, practicable and substantial form of joint consisting of a pin and inner member with coarse pitch threads and an outer socket or box member complementary thereto, these members being provided with complementary ground joint-forming peripheral shoulders to form a tight abutment between the two members as well as to hold them in attached relation. Another object of the invention is to provide a deep well tool joint the inner or pin member of which is provided with a water bore having means for imparting to the flowing water and mud a gyrating movement to maintain agitation of the circulating fluid.

Another object is to provide an improved deep well tool joint having provision for the removal of the internally threaded collar end and the rethreading of the remainder of the collar, thus to secure a joint member whose life of service is increased by the rethreading provision.

Other objects and advantages will be made manifest in the following specification of an embodiment of the invention illustrated in the accompanying drawings, wherein Figure 1 is a longitudinal central section of the improved joint to which are attached sections of pipe;

Figure 1:
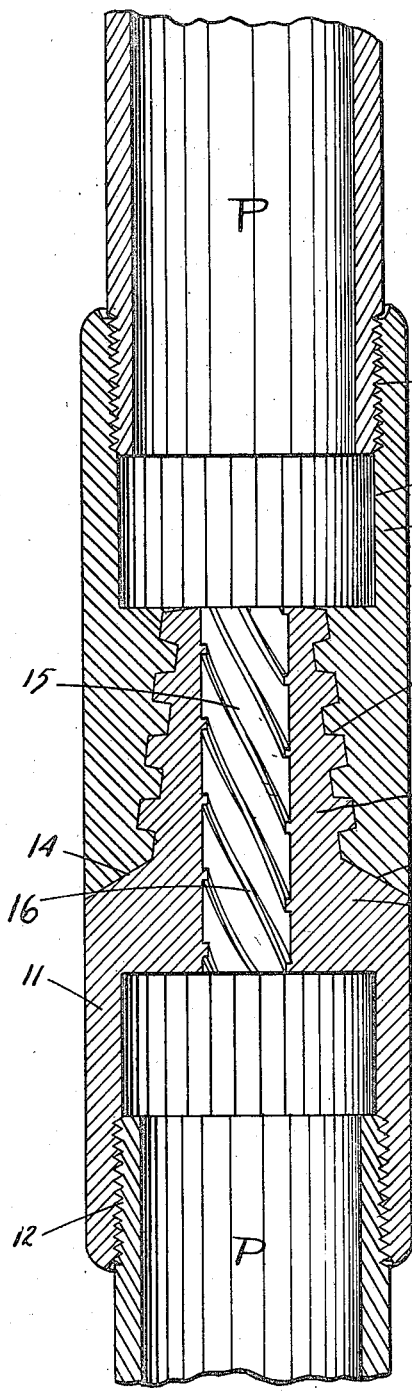
Figure 2:
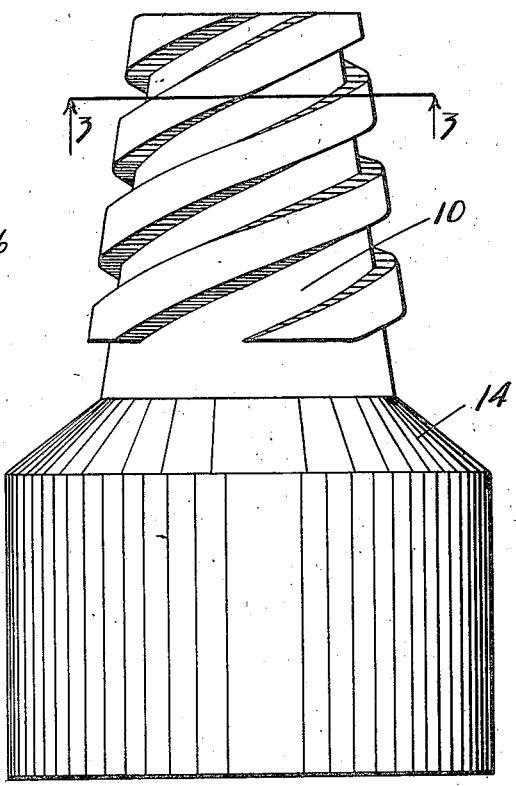
Figure 2 is a side elevation of the inner or pin member of the joint.
Figure 3:
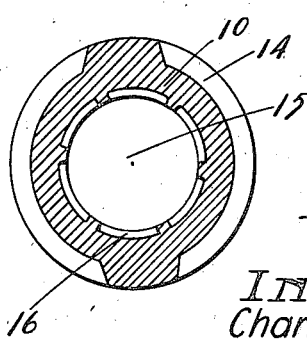
Figure 3 is a cross section of the tapered pin, showing the rifling.

The joint of the present invention consists of an upper socket member 2 having a substantial, lower end provided with a coarse pitch thread device 3 preferably of conical form, and the lower end of member 2 is internally conically turned and ground out as at 4. The socket member 2 is of somewhat elongated form and its upper end is internally bored and threaded as at 5 to form a collar for the reception of the contiguous end of a section of pipe P. The threads 5 extend into the bore a sufficient distance to receive the threaded end of the pipe P securely. Because of the great stresses, strains and abuse to which deep well pipe joints are subjected, the pipe receiving threads and the collar end of the joint member 2 are usually so distorted after a period of use as to be rendered useless, and an object of the invention is to provide for the removal of the initially threaded hollow end of the member 2 when this has been rendered useless and to provide a sufficient length of bore for rethreading. Such extra length of bore is indicated at 6, and when the initial end or collar portion has been destroyed it may be turned off and the bored portion 6 is then threaded ready for the reception of a pipe end.

Complementary to the tapered threads 3 of the socket member, there is provided a pin member 10 of similar conical form and similar thread means, this pin being formed upon one end of a sleeve 11 which is internally threaded at 12 to receive a contiguous pipe end P. The end face 13 of the sleeve 11 from which projects the pin 10 has its corner beveled, as at 14, complementary to the bell or bevel of the member 2, so that when the two joint members are secured together the complementary bevels 4 and 14 will jam tightly on each other and form a rigid as well as water-tight joint between end meeting faces.

A feature of the invention is the provision through the pin 10 of a bore 15 which serves as a conduit for the circulating mud or water through the string of pipe, and it is very desirable to provide means for obtaining a swirling or rotating movement through the column of liquid to maintain agitation and prevent the mud from settling. The swirling or rotating movement of the column of liquid passing through the rifled bore of the pin 10 serves also to impart a turning movement to the pin 10, tending to keep pin 10 and socket member 2 securely locked together. It is not uncommon that the string of casings in deep wells in the drilling operations become uncoupled, and the swirling movement of the column of liquid tends to prevent such uncoupling. This we accomplish by means of helical rifling 16 along the surface of the bore 15 of the pin.

From the foregoing, it will be seen that we have provided an extremely simple, practicable, efficient, inexpensive and durable form of deep well tool joint.

It is obvious that by the present type of tapered thread box and tapered thread pin, it will be unnecessary to employ or provide for any end countersink or recess in the box at its receiving end since the tapered threads will readily guide the parts into axial position.

It is to be understood that the present improvement may be incorporated in any of desirable elements in a string of tool parts, for instance, the improvements may be incorporated in drill collars as well as in the pipe receiving joints.

Further embodiments, modifications and variations may be resorted to within the spirit of the invention as here claimed.

What is claimed is:

1. In a tool joint, a member having an externally threaded pin portion which is longitudinally bored, the surface of said bore being provided with means for whirling liquid flowing therethrough.

2. In a tool joint, a member having an externally threaded pin portion which is longitudinally bored, the surface of said bore being provided with rifling for whirling liquid flowing therethrough.

In testimony whereof we have signed our names to this specification.

CLARENCE D. REYNOLDS.
CHARLES B. REYNOLDS.